(12) United States Patent
Seethaler et al.

(10) Patent No.: US 9,071,067 B2
(45) Date of Patent: *Jun. 30, 2015

(54) FAST BATTERY CHARGING SYSTEM AND METHOD

(75) Inventors: Kenneth Scott Seethaler, Wake Forest, NC (US); Tin-Lup Wong, Chapel Hill, NC (US); Shigefumi Odaohhara, Kanagawa (JP); Jeremy Robert Carlson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 696 days.

This patent is subject to a terminal disclaimer.

(21) Appl. No.: 13/106,362

(22) Filed: May 12, 2011

(65) Prior Publication Data

US 2012/0286741 A1 Nov. 15, 2012

(51) Int. Cl.
*H02J 7/00* (2006.01)

(52) U.S. Cl.
CPC ............. *H02J 7/0055* (2013.01); *H02J 7/0068* (2013.01); *H02J 7/0054* (2013.01)

(58) Field of Classification Search
CPC ...................................................... H02J 7/0042
USPC .................................. 320/137, 118, 116, 128
See application file for complete search history.

(56) References Cited

U.S. PATENT DOCUMENTS

| | | | |
|---|---|---|---|
| 5,565,756 A | 10/1996 | Urbish et al. | |
| 5,721,481 A | 2/1998 | Narita et al. | |
| 5,783,927 A | 7/1998 | Chen | |
| 5,784,626 A | 7/1998 | Odaohara | |
| 6,459,175 B1 | 10/2002 | Potega | |
| 6,888,338 B1 | 5/2005 | Popescu-Stanesti et al. | |
| 8,669,736 B2 | 3/2014 | Seethaler et al. | |
| 2003/0085621 A1 | 5/2003 | Potega | |
| 2004/0217737 A1* | 11/2004 | Popescu | 320/128 |
| 2005/0162020 A1* | 7/2005 | Lanni | 307/121 |
| 2008/0143290 A1* | 6/2008 | Chavakula | 320/101 |
| 2009/0079262 A1 | 3/2009 | Ohtomo | |
| 2009/0273319 A1* | 11/2009 | Young et al. | 320/162 |
| 2010/0201306 A1* | 8/2010 | Kazama et al. | 320/106 |
| 2011/0074360 A1* | 3/2011 | Kerr et al. | 320/137 |
| 2012/0229074 A1 | 9/2012 | Seethaler et al. | |
| 2012/0299532 A1 | 11/2012 | Seethaler et al. | |

OTHER PUBLICATIONS

"U.S. Appl. No. 13/042,907, Advisory Action mailed Aug. 1, 2014", 3 pgs.
"U.S. Appl. No. 13/042,907, Final Office Action mailed May 13, 2014", 11 pgs.
"U.S. Appl. No. 13/042,907, Non Final Office Action mailed Oct. 4, 2013", 12 pgs.
"U.S. Appl. No. 13/042,907, Non Final Office Action mailed Oct. 24, 2014", 11 pgs.
"U.S. Appl. No. 13/042,907, Response filed Jan. 6, 2014 to Non Final Office Action mailed Oct. 4, 2013", 9 pgs.

(Continued)

*Primary Examiner* — Yalkew Fantu
(74) *Attorney, Agent, or Firm* — Schwegman Lundberg & Woessner, P.A.

(57) ABSTRACT

A system and method includes detecting whether a fast charger is coupled to a system having a processor and a memory, providing current to a battery from an internal charger circuit if no fast charger is detected, and providing current to the battery from the fast charger if the fast charger is detected.

20 Claims, 2 Drawing Sheets

(56) References Cited

OTHER PUBLICATIONS

"U.S. Appl. No. 13/042,907, Response filed Jul. 14, 2014 to Final Office Action mailed May 13, 2014", 10 pgs.
"U.S. Appl. No. 13/114,689, Response filed Oct. 3, 2013 to Non Final Office Action mailed Jul. 17, 2013", 8 pgs.
"U.S. Appl. No. 13/114,689, Non Final Office Action mailed Jul. 17, 2013", 7 pgs.
"U.S. Appl. No. 13/114,689, Notice of Allowance mailed Oct. 25, 2013", 8 pgs.
"U.S. Appl. No. 13/114,689, Preliminary Amendment Filed Jun. 22, 2011", 7 pgs.
"U.S. Appl. No. 13/042,907, Final Office Action mailed May 15, 2015", 15 pgs.

\* cited by examiner

FAST BATTERY CHARGING SYSTEM AND METHOD

BACKGROUND

Notebook computers generally have an internal charging circuit that delivers power to a battery to recharge the battery. The battery provides power to the notebook computer when AC power is not available. Newer batteries can be charged faster by providing higher charging currents. However, charging circuits that provide such higher currents create additional heat to be removed from the notebook computer to enable the notebook computer to operate within desired temperature ranges.

SUMMARY

A system and method includes detecting whether a fast charger is coupled to a system having a processor and a memory, providing current to a battery from an internal charger circuit if no fast charger is detected, and providing current to the battery from the fast charger if the fast charger is detected.

An apparatus includes an enclosure including a processor and memory, an internal charger to receive DC power from an external supply and provide charging current to charge a battery, a battery connector to receive current from the internal charger and to provide current to the processor and memory devices, and a fast charge connector to receive a fast charging current from a charger module and selectively couple the fast charging current to the battery connector.

A system includes an enclosure including a processor and memory, an internal charger within the frame to receive DC power from an external supply and provide charging current to charge a battery, a battery connector to receive current from the internal charger and to provide current to the processor and memory from a battery when connected, a fast charge connector to receive a fast charging current from a charger module when connected and selectively couple the fast charging current to the battery connector, an internal charger switch coupled between the internal charge circuit and the battery connector, a fast charger switch coupled between the fast charge connector and the battery connector, wherein the fast charge connector includes conductors to control the charger switches, and a current control device coupled between the fast charger connector and the fast charger switch.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or. more modules as desired, and the embodiments described are merely examples. The software may be executed on a digital signal processor, ASIC, microprocessor, or other type of processor operating on a computer system, such as a personal computer, server or other computer system.

There is no way to deliver high current to battery cells within a system, such as a notebook computer without having a robust charging circuit able to handle the thermal load. It is a challenge to dissipate heat using such a charging circuit. There is also higher cost associated to a larger charging circuit even if thermal loads are addressed.

Current fast charging solutions use a larger than normal AC adapter and a larger than normal charging circuit within a notebook computer or other apparatus. The down sides are cost in both the AC adapter as well as the electrical and thermal design at the system level.

Figure 1:
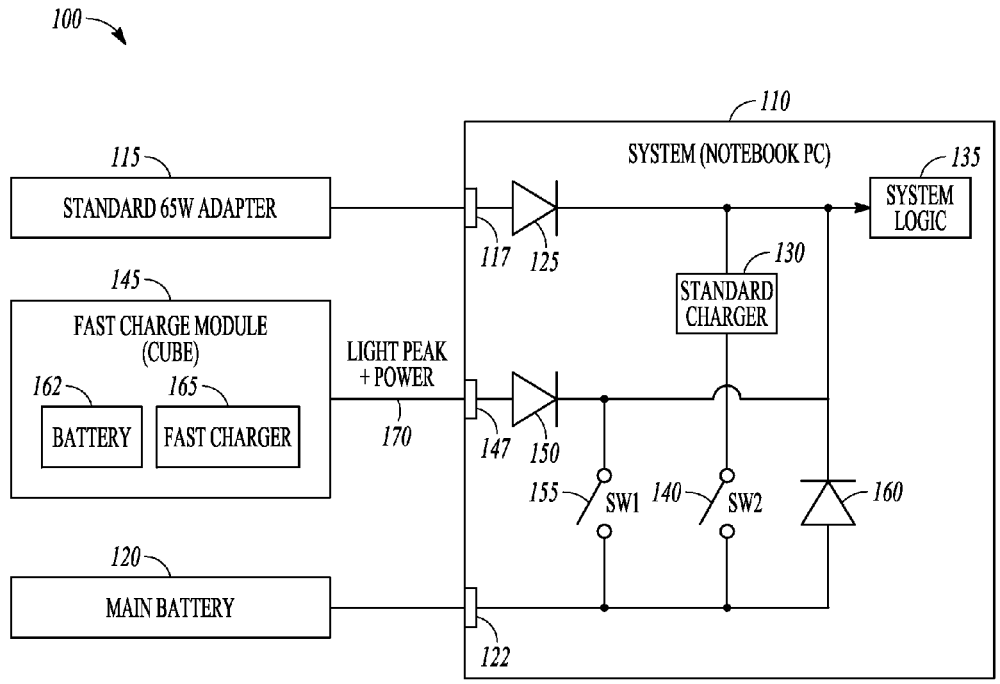
FIG. 1 is a block diagram of a notebook computer coupled to a fast charge module according to an example embodiment.

A charging system 100 for an apparatus, such as a notebook computer 110 is shown block form in FIG. 1. While drawn in block form, reference number 110 is also used to represent an enclosure within which the apparatus is enclosed. A standard AC adapter 115, such as a 65 watt adapter is shown coupled to the computer 110 via an AC adapter input 117. The AC adapter 115 provides a suitable DC power source for the notebook computer 110 sufficient to operate electrical components in the computer and to charge a main battery 120 coupled to the computer 110 via a battery connector 122.

In one embodiment, the AC adapter 115 is coupled via a diode 125, or other current control device allowing the flow of current in a desired direction, to an internal charging circuit 130 and optionally to system logic 135. Note that the term, diode, is meant to include a field effect transistor (FET) configured to behave as a diode with respect to current flow. An FET includes a parasitic diode (body diode) and a switch that are connected in parallel. When FET is off state (switch is off), it works as a diode. In some embodiments, FETs may be used to control current flow in all locations since FET exhibits low power losses.

In the case of a notebook computer, the system logic 135 generally includes one or more processors, random access memory devices, data storage devices, monitors and other user interface devices that consume electricity.

The internal charging circuit 130 may be selectively coupled to the battery via an internal charger switch 140 such that the main battery is charged at a standard rate that does not generate undesirable amounts of heat by the internal charging circuit. Charger switch 140 and other switches in various embodiments may be a MOSFET in one embodiment, or other switch as desired. A fast charge module 145 is provided in one embodiment external to the notebook computer 110 and may be coupled via a fast charge module connector 147 in the notebook computer 110. The fast charger module 145 can provide additional charging current via a diode 150. The additional charging current may be applied to the battery 120 via a fast charger switch 155, and also may be provided to the system logic 135. In one embodiment, a diode 160 is coupled between the system logic 135 and the battery 120 to ensure current from the battery 120 is provided to the system logic.

In one embodiment, the fast charger module includes an AC adapter that may have a higher wattage than adapter 115. In further embodiments, the fast charger module 145 may include a battery 162 capable of providing desired current to charge main battery 120 in a fast manner, which is generally faster than the rate at which internal charger 130 can charge battery 120.

The switches 140 and 155 are located on a conductor between the current control device 160 and battery 120. The fast charge module 145 may include a fast charger circuit 165 to provide voltage regulation and the fast charging current. The fast charger circuit 165 may also provide current to the system logic during times when the system logic current requirements exceed levels that may be provided by the internal charging circuit. The fast charge module 145 in one embodiment is adapted to couple to an AC power source and convert the AC power into a regulated DC voltage and DC current.

A normal charge rate can be supplied by the 65 watt adapter using the on-system board standard charger circuit. For faster charge applications, the separate fast charge module with an integrated charger circuit (where the regulation occurs) is used to deliver the battery charge voltage directly to the cells. This way all regulation losses associated with heat generation occur outside of the system, minimizing the demands on thermal management handling within the notebook computer 110.

Notebook computer 110 or alternatively, fast charge module 145 detects whether a fast charge module 145 is attached and operable to provide fast charging current. The detection may be done by either interrogating the attached devices, via electromechanical switches, or via information provided by the fast charge module via connections to the notebook computer 110. The information regarding types of devices attached is used to control the switches 140 and 155 to provide either standard charging current via internal charger 130 and switch 140, or higher rate charging current via switch 155, bypassing the standard charge circuitry 130.

Notebook computer 110 may also provide information to the battery unit 120 regarding the type of charging current to be provided. In one embodiment, the notebook computer 110 or fast charge module 145 directly controls the switches, whereas in further embodiments, the battery 120 receives information from the notebook computer 110 regarding whether or not fast charging current is available and capable of charging at a higher rate charging current or standard charging current. Battery 120 may use that information to control the switches 140, 155. Placing the high rate current charger 165 in a separate fast charge module 145 serves to place the heat, cost, and size into the expansion battery and outside the notebook computer 110 enclosure.

Figure 2:
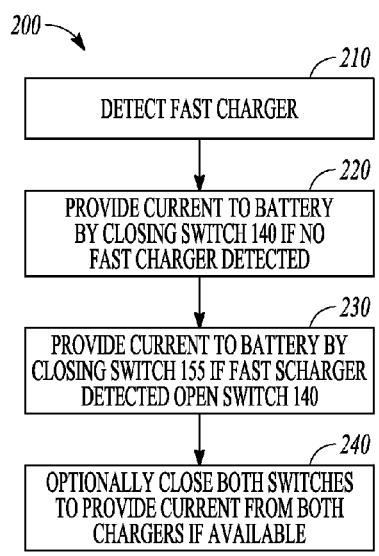
FIG. 2 is a flowchart illustrating a method of battery charging according to an example embodiment.

A method 200 in FIG. 2 illustrates control of the switches 140 and 155 in one embodiment. At 210, either the fast charge module, or other control logic within the notebook computer detects whether the fast charge module 145 is connected to the notebook computer 110 and is able to supply current to charge the battery more quickly via fast charger 165. At 220, current is provided to the battery from the internal charger circuit if no fast charger is detected. This is done in one embodiment by closing switch 140 and leaving switch 155 in an open state. At 230, current is provided to the battery from the fast charger 165 if the fast charger is detected.

In further embodiments, both chargers may provide current to the battery 120 at the same time by closing both switches 140 and 155 as illustrated optionally at 240.

Figure 3:
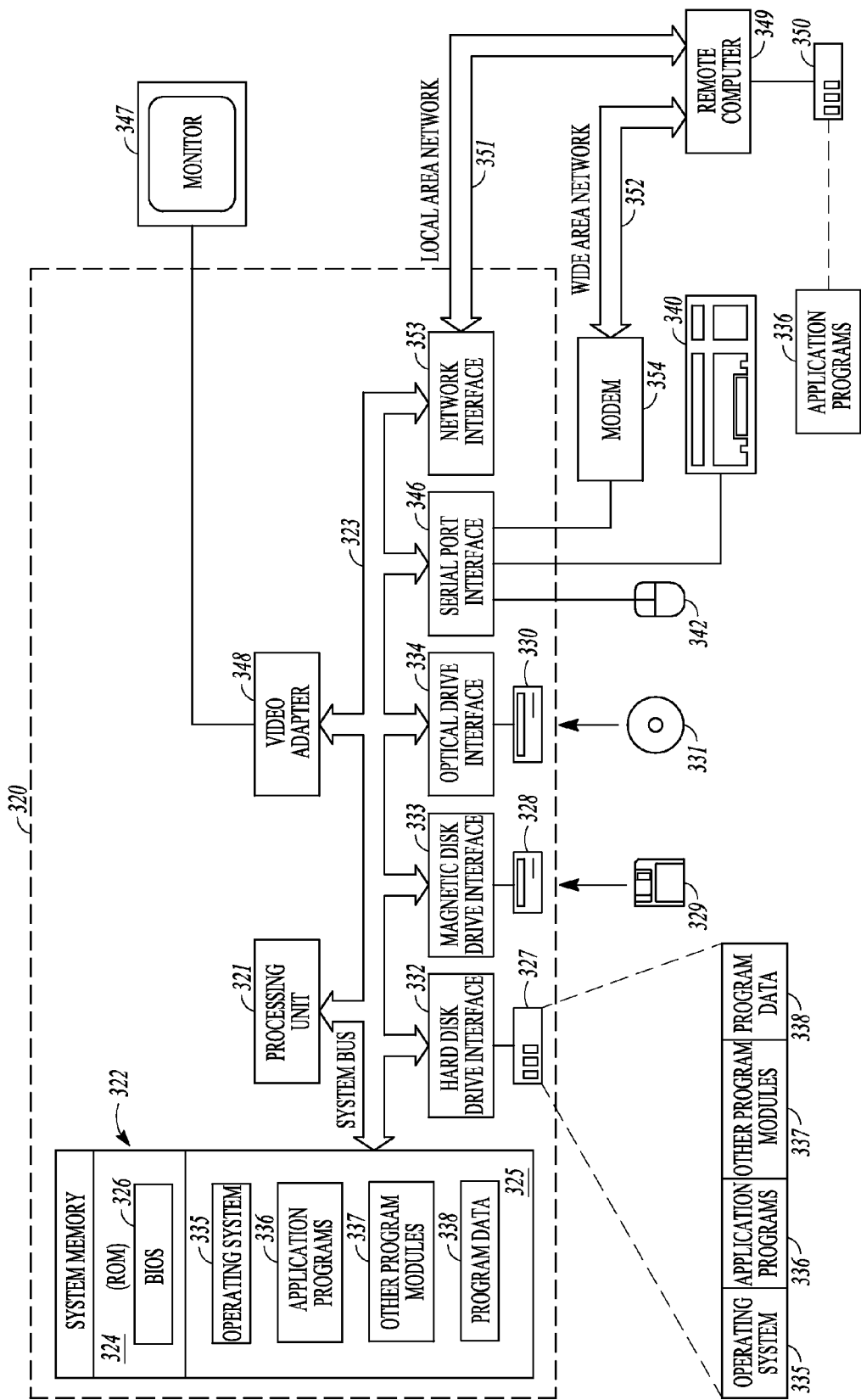
FIG. 3 is a block schematic diagram of a computer system to implement one or more methods and systems according to an example embodiment.

FIG. 3 is a block diagram of a notebook computer system to implement methods according to an example embodiment. In the embodiment shown in FIG. 3, a hardware and operating environment is provided that operates to execute programming that is stored on computer readable storage devices to implement one or more of the methods described.

As shown in FIG. 3, one embodiment of the hardware and operating environment includes a general purpose computing device in the form of a computer 300 (e.g., a personal computer, workstation, or server), including one or more processing units 321, a system memory 322, and a system bus 323 that operatively couples various system components including the system memory 322 to the processing unit 321. There may be only one or there may be more than one processing unit 321, such that the processor of computer 300 comprises a single central-processing unit (CPU), or a plurality of processing units, commonly referred to as a multiprocessor or parallel-processor environment. In various embodiments, computer 300 is a conventional computer, a distributed computer, or any other type of computer.

The system bus 323 can be any of several types of bus structures including a memory bus or memory controller, a peripheral bus, and a local bus using any of a variety of bus architectures. The system memory can also be referred to as simply the memory, and, in some embodiments, includes read-only memory (ROM) 324 and random-access memory (RAM) 325. A basic input/output system (BIOS) program 326, containing the basic routines that help to transfer information between elements within the computer 300, such as during start-up, may be stored in ROM 324. The computer 300 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD ROM or other optical media.

The hard disk drive 327, magnetic disk drive 328, and optical disk drive 330 couple with a hard disk drive interface 332, a magnetic disk drive interface 333, and an optical disk drive interface 334, respectively. The drives and their associated computer-readable media provide non volatile storage of computer-readable instructions, data structures, program modules and other data for the computer 300. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 329, optical disk 331, ROM 324, or RAM 325, including an operating system 335, one or more application programs 336, other program modules 337, and program data 338. Programming for implementing one or more processes or method described herein may be resident on any one or number of these computer-readable media.

A user may enter commands and information into computer 300 through input devices such as a keyboard 340 and pointing device 342. Other input devices (not shown) can include a microphone, joystick, game pad, satellite dish, scanner, or the like. These other input devices are often connected to the processing unit 321 through a serial port interface 346 that is coupled to the system bus 323, but can be connected by other interfaces, such as a parallel port, game port, or a universal serial bus (USB). A monitor 347 or other type of display device can also be connected to the system bus 323 via an interface, such as a video adapter 348. The monitor 347 can display a graphical user interface for the user. In addition to the monitor 347, computers typically include other peripheral output devices (not shown), such as speakers and printers.

The computer 300 may operate in a networked environment using logical connections to one or more remote computers or servers, such as remote computer 349. These logical connections are achieved by a communication device coupled to or a part of the computer 300; other types of communication devices may also be used. The remote computer 349 can be another computer, a server, a router, a network PC, a client, a peer device or other common network node, and typically includes many or all of the elements described above I/0 relative to the computer 300, although only a memory storage device 350 has been illustrated. The logical connections depicted in FIG. 3 include a local area network (LAN) 351 and/or a wide area network (WAN) 352. Such networking environments are commonplace in office networks, enterprise-wide computer networks, intranets and the internet, which are all types of networks.

When used in a LAN-networking environment, the computer 300 is connected to the LAN 351 through a network interface or adapter 353, which is one type of communications device. In some embodiments, when used in a WAN-networking environment, the computer 300 typically includes a modem 354 (another type of communications device) or any other type of communications device, e.g., a wireless transceiver, for establishing communications over the wide-area network 352, such as the internet. The modem 354, which may be internal or external, is connected to the system bus 323 via the serial port interface 346. In a networked environment, program modules depicted relative to the computer 300 can be stored in the remote memory storage device 350 of remote computer, or server 349. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. An apparatus comprising:
an enclosure including a processor and memory;
an internal charger to receive DC power from an external supply and provide charging current to charge a battery;
a battery connector to receive the charging current from the internal charger and to provide current to the processor and memory; and
a fast charge connector to receive a fast charging current from an external charger module and selectively couple the fast charging current to the battery connector, bypassing the internal charger.

2. The apparatus of claim 1 and further comprising:
an internal charger switch coupled between the internal charge circuit and the battery connector; and
a fast charger switch coupled between the fast charge connector and the battery connector.

3. The apparatus of claim 2 wherein the fast charge connector includes conductors to control the charger switches.

4. The apparatus of claim 1 and further comprising a current control device coupled between the fast charger connector and the fast charger switch.

5. The apparatus of claim 1 and further comprising a current control device coupled between the battery connector and the processor and memory.

6. The apparatus of claim 1 and further comprising a fast charger coupled to the fast charger connector.

7. The apparatus of claim 1 wherein the fast charger is adapted to couple to an AC power source.

8. A system comprising:
an enclosure including a processor and memory;
an internal charger within the frame to receive DC power from an external supply and provide charging current to charge a battery;
a battery connector to receive the charging current from the internal charger and to provide current to the processor and memory from a battery when connected;
a fast charge connector to receive a fast charging current from an external charger module when connected and selectively couple the fast charging current to the battery connector, bypassing the internal charger;
an internal charger switch coupled between the internal charge circuit and the battery connector;
a fast charger switch coupled between the fast charge connector and the battery connector, wherein the fast charge connector includes conductors to control the charger switches; and
a current control device coupled between the fast charger connector and the fast charger switch.

9. The system of claim 8 and further comprising a current control device coupled between the battery connector and the processor and memory.

10. The system of claim 9 and further comprising a fast charger coupled to the fast charger connector.

11. The system of claim 10 wherein the fast charger controls the switches such that only one switch is closed to provide charging current to the battery connector.

12. The system of claim 10 wherein the fast charger is operable to control the switches such that current is provided to the processor and memory from the fast charger.

13. The system of claim 10 wherein the internal charger is adapted to control the switches.

14. The system of claim 13 wherein the internal charger is adapted to sense whether a fast charger is operating.

15. A method comprising:
detecting whether an external fast charger is coupled to a system having a processor and a memory;
providing current to a battery from an internal charger circuit if no fast charger is detected; and
providing current to the battery from the fast charger if the fast charger is detected, the internal charger.

16. The method of claim 15 wherein providing current to a battery from the internal charger comprises closing a switch between the internal charger and a battery connector.

17. The method of claim 16 wherein providing current to a battery from the internal charger further comprises providing current to the processor and memory from the battery via a current control device.

18. The method of claim 15 wherein providing current to a battery from the fast charger comprises closing a switch between the fast charger and a battery connector.

19. The method of claim 18 wherein providing current to a battery from the fast charger further comprises providing current to the processor and memory from the fast charger via a current control device.

20. The method of claim 19 and further comprising providing current from the battery to the processor and memory via a separate current control device.

* * * * *